United States Patent [19]
Wong

[11] 3,994,212
[45] Nov. 30, 1976

[54] DRAIN PAN FOR MICROWAVE OVEN
[75] Inventor: Chuck Toy Wong, Alert Bay, Canada
[73] Assignee: The Raymond Lee Organization, Inc., New York, N.Y. ; a part interest
[22] Filed: Mar. 10, 1975
[21] Appl. No.: 556,899

[52] U.S. Cl. ............................ 99/444; 219/10.55 E
[51] Int. Cl.² ......................................... A47J 27/00
[58] Field of Search ............ 99/444, 375, 400, 408, 99/419, 425–426, 446, 449–450; 219/10.55

[56] References Cited
UNITED STATES PATENTS

| | | | |
|---|---|---|---|
| 1,301,197 | 4/1919 | Tully.................................... | 99/446 |
| 2,673,003 | 3/1954 | Stewart............................ | 99/444 U |
| 2,875,683 | 3/1959 | Burns................................... | 99/425 |
| 2,951,435 | 9/1960 | Fry..................................... | 99/446 X |
| 3,230,864 | 1/1966 | Krajewski............................ | 99/446 |
| 3,427,955 | 2/1969 | Menzin................................. | 99/444 |
| 3,453,949 | 7/1969 | Levin................................... | 99/446 |
| D177,360 | 4/1956 | Becker et al.................. | 99/444 UX |

*Primary Examiner*—Edward L. Roberts
*Assistant Examiner*—Arthur O. Henderson
*Attorney, Agent, or Firm*—Howard I. Podell

[57] ABSTRACT

A non-metallic heat resistant food pan in a microwave oven shaped with parallel rounded upraised ridges on its bottom surface on which the food may be rested, the valleys of said bottom surface serving as reservoirs for drained fat and oil. A continuous recessed groove runs along the middle of the pan, perpendicular to the ridges to join all the valleys to prevent overflow of oil in one section of the pan. The pan is preferably made of temperature resistant glass such as Pyrex glass.

1 Claim, 4 Drawing Figures

DRAIN PAN FOR MICROWAVE OVEN

SUMMARY OF THE INVENTION

My invention is a non-metallic heat resistant food pan in a microwave oven shaped with parallel rounded upraised ridges on its bottom surface on which the food may be rested, the valleys of said bottom surface serving as reservoirs for drained fat and oil.

A continuous recessed groove runs along the middle of the pan, perpendicular to the ridges to join all the valleys to prevent overflow of oil in one section of the pan.

The pan is preferably made of temperature resistant glass such as Pyrex glass.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
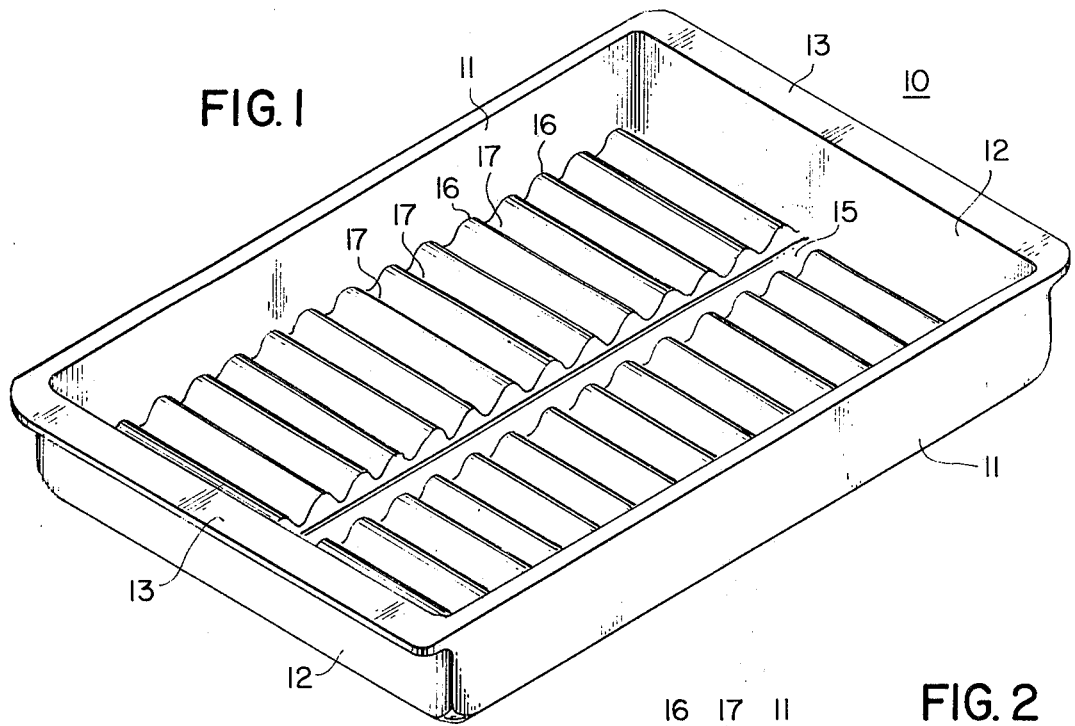
FIG. 1 is a perspective view of the invention.
Figure 4:
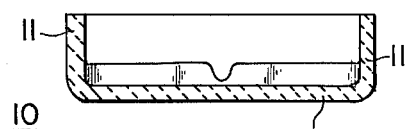
FIG. 4 is a sectional view taken along line IV—IV of FIG. 3.
Figure 2:
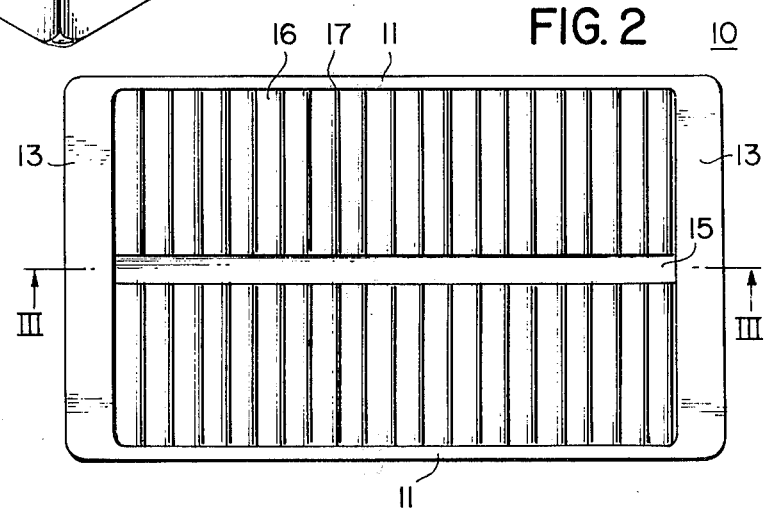
FIG. 2 is a plan view of the invention.
Figure 3:
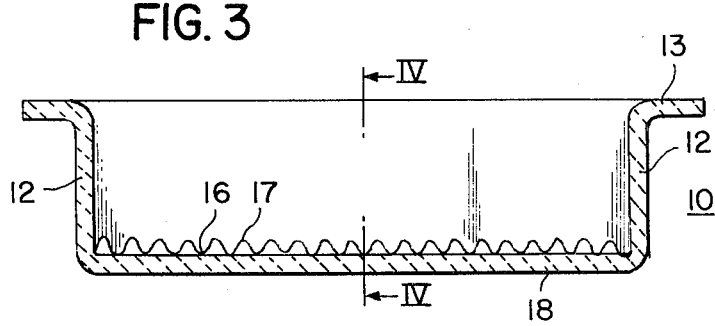
FIG. 3 is a sectional view taken along line III—III of FIG. 2.

Turning now descriptively to the drawings, in which similar reference characters denote similar elements throughout the several views, FIGS. 1–4 illustrate the microwave pan 10 which is preferably formed of a heat resistant glass such as Pyrex glass or other heat resistant non-metallic material.

The pan 10 is formed with a bottom 18 joined to upraised sides 11 and ends 12, with a projecting flange 13 joined to the top of each end 12.

The bottom 18 of the pan is formed on its interior surfaces with a series of parallel upraised rounded ridges 16 on which food may be rested out of contact with the valleys 17 between ridges 16 in which oil and fats collect.

A continuous recessed groove 15 cuts through the middle section of each ridge 16 to join all the valleys 17 above the bottom of the valley 17, so that the oils may drain from individual valleys 17 in use, without overflowing to contact food resting on the ridges 16.

The pan 10 containing food may be placed in a microwave oven for heating of the food, without the pan affecting the operation of the oven, since it is of non-metallic nature and without the pan being excessively heated.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A pan for use in containing food being heated in a microwave oven, said pan formed of a non-metallic heat resistant material and shaped with upraised sides joined to a bottom, said bottom formed on its interior side in a series of upraised projections on which food may be rested out of contact with oils which may drain from the food into the recessed section of the bottom surrounding said projections, said projections formed as a plurality of parallel upraised ridges bounding a plurality of valleys, said ridges each formed with rounded corners, with each of said ridges cut by a slot through the mid-length of each ridge, said slot not extending to the bottom of the said valleys.

* * * * *